T. KINGSFORD.
Process and Apparatus for Drying Starch.
No. 202,832. Patented April 23, 1878.
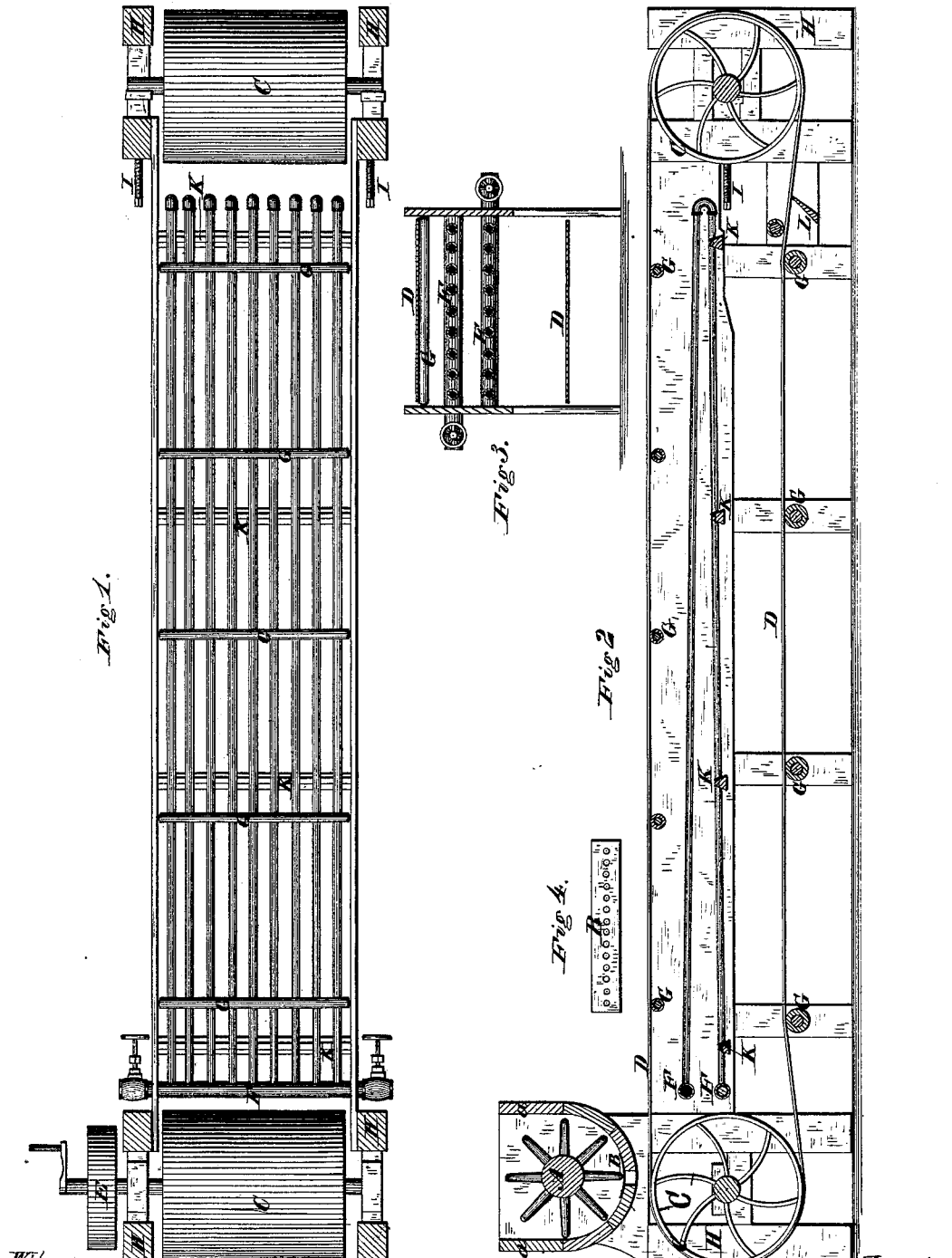

UNITED STATES PATENT OFFICE.

THOMSON KINGSFORD, OF OSWEGO, NEW YORK.

IMPROVEMENT IN PROCESSES AND APPARATUS FOR DRYING STARCH.

Specification forming part of Letters Patent No. 202,832, dated April 23, 1878; application filed October 16, 1877.

*To all whom it may concern:*

Be it known that I, THOMSON KINGSFORD, of the city of Oswego, in the county of Oswego and State of New York, have invented a new and useful Improvement in the Art of Manufacturing Starch; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention or discovery relates to an improvement in the art of manufacturing starch; and consists in dividing it, when in its liquid or plastic state, into small particles or flakes, and subjecting it thus divided to the action of heat at ordinary pressure of the air, by which treatment it becomes dry and crystalline in a short time, and retains all its strength and purity. This improved process dispenses with the greater part of that now in use, as will be hereinafter more specifically set forth, and is simple and quick in its operation, thereby producing a great saving of time and cost in the manufacture.

The process now in general use for the manufacture of starch is to draw off the starch-containing material, in a comminuted and liquid state, into boxes having perforated bottoms, lined with cotton cloth, through which the water leaches, leaving the starch in a solid and plastic condition—a process requiring about twenty-four hours. When this mass has become sufficiently dry for the purpose, it is broken up into cubes about six inches square, and placed upon heated absorbent tiles, where it remains for about twenty hours. It is then placed in the crusting-kilns, and remains there from twenty-four to thirty-six hours longer. The blocks are then taken out, scraped of their discolored crust or coating, wrapped in paper, tied up, and placed in the finishing kilns or ovens, where it remains from six to twenty-four days, according to the quality of the product desired. The entire process occupies from ten to thirty days, and is the only process known to starch-manufacturers up to the date of the present discovery or invention.

The centrifugal method of drying, it is true, was tried, but proved an entire failure, and has never been practically used. After thirty-five years' experience as a starch-manufacturer, I have discovered that this old, expensive, and tedious process can be dispensed with, and starch of a superior quality, unusual strength, and greater beauty produced in a few minutes from the liquefied starch-bearing material taken just as it flows from the tank.

In the practical working of my discovery, I make use of a machine which is represented in the accompanying drawings, in which—

Figure 1 is a plan or top view; Fig. 2, a vertical longitudinal section; Fig. 3, a transverse section; Fig. 4, a perforated plate.

Letter A is a revolving shaft, with projecting arms, to keep in agitation the liquid starch contained in the semicircular tank $a\ a$; B, a perforated plate, forming the bottom of the tank. C C are pulleys for carrying the belt; D, cloth or textile endless belt, of absorbent material; E, pulley for driving-shaft A; F, heating-pipes; G, rollers for carrying the belt; H, frame of the machine; I tension-bolts; L, scraper for cleaning the belts; K, support for the pipes.

The operation is performed by carrying into the tank $a\ a$ starch in a liquid state, which, while being agitated by the revolving shaft A, gradually passes through the perforated plate or bottom, and drops upon the continuously-traveling belt D, and is carried thence forward on rollers G over a heated surface any desired distance, until properly dried, heat being transmitted to the belt from below by means of steam, hot water, or hot air passing through pipes properly provided with valves or cocks for regulating the heat, or by any other suitable means. The length of the belt is such as to secure the desired result, and the flakes, if any adhere, are removed by the scraper.

In the old process the heating does not begin till the starch has been drained of its contained water, and has become plastic and partially solid. In the new process the starch is applied to the heating-surface in a semi-fluid condition. In the old process the starch is heated and dried in large masses, cubes of six inches square. In the new, it is applied to the heating apparatus in drops or masses of small size. In the old, it is subjected to two heatings in close furnaces. In the new, it is dried by one heat in the open air. In the old, a considerable loss occurred by reason of the scraping, on leaving the crusting-kiln, to remove impurities. In the new, there is no such loss, and no opportunity to accumulate impurities. In the old, there was great expenditure of labor and time. In the new, nine-tenths of this labor is dispensed with, and the time employed in the drying process is insignificant. In the old, the long subjection of the starch to a high heat in close kilns tended to diminish its strength, while the new process leaves it entirely unaffected.

The result of the new process is the production of a pure, strong, and beautiful article of starch, differing in appearance from any heretofore known in the market.

Having thus described my invention, I claim—

1. As an improvement in the art of manufacturing starch, the method of treatment hereinbefore described, the same consisting in delivering the liquefied material in drops or small masses upon a moving absorbent surface, while subjecting it in this state of subdivision to the action of heat at ordinary pressure of air, in the manner and for the purpose specified.

2. In a machine for drying starch, the combination of the tank $a\ a$, provided with the stirring-shaft A, and perforated bottom plate B, with the endless belt D, supporting and operating mechanism, as described, and steam-heating pipes F, all constructed and arranged to operate substantially as and for the purpose described.

In testimony that I claim the foregoing as my own invention I affix my signature in the presence of two witnesses.

THOMSON KINGSFORD.

Witnesses:
GEORGE WATKIN GEVITT,
WILLIAM W. SCRIBNER.